(12) United States Patent
Nukaga

(10) Patent No.: US 8,416,435 B2
(45) Date of Patent: Apr. 9, 2013

(54) INSTALLATION LOCATION MANAGEMENT SYSTEM AND INSTALLATION LOCATION MANAGEMENT METHOD

(75) Inventor: Ryohei Nukaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1342 days.

(21) Appl. No.: 11/877,818

(22) Filed: Oct. 24, 2007

(65) Prior Publication Data

US 2008/0151290 A1 Jun. 26, 2008

(30) Foreign Application Priority Data

Dec. 26, 2006 (JP) ................................ 2006-349998

(51) Int. Cl.
*G06F 3/12* (2006.01)
(52) U.S. Cl.
USPC ........... 358/1.15; 358/1.9; 709/223; 709/224; 715/734; 715/764; 715/853
(58) Field of Classification Search .................. None
See application file for complete search history.

(56) References Cited

U.S. PATENT DOCUMENTS

| | | | | | |
|---|---|---|---|---|---|
| 5,809,265 | A | * | 9/1998 | Blair et al. | 715/764 |
| 5,831,618 | A | * | 11/1998 | Fuji et al. | 715/853 |
| 5,848,373 | A | * | 12/1998 | DeLorme et al. | 701/200 |
| 6,181,341 | B1 | * | 1/2001 | Shinagawa | 715/734 |
| 6,470,387 | B1 | * | 10/2002 | Fischer | 709/224 |
| 6,996,611 | B1 | * | 2/2006 | Muto | 709/223 |
| 7,054,651 | B2 | * | 5/2006 | Ocke | 455/456.3 |
| 7,080,166 | B2 | * | 7/2006 | Yokoyama | 710/10 |
| 7,124,177 | B2 | * | 10/2006 | Watanabe | 709/223 |
| 7,379,991 | B2 | * | 5/2008 | Muto | 709/223 |
| 7,849,174 | B2 | * | 12/2010 | Kawashima | 709/223 |
| 2003/0115199 | A1 | * | 6/2003 | Ochiai et al. | 707/10 |
| 2005/0165922 | A1 | * | 7/2005 | Hatano | 709/223 |
| 2006/0218510 | A1 | * | 9/2006 | Ward | 715/853 |

FOREIGN PATENT DOCUMENTS

| | | | |
|---|---|---|---|
| JP | 2003316667 A | * | 11/2003 |
| JP | 2004-021328 A | | 1/2004 |

* cited by examiner

*Primary Examiner* — Dung Tran
(74) *Attorney, Agent, or Firm* — Sughrue Mion, PLLC

(57) ABSTRACT

There is provided an installation location management system includes a management device (MD) and an information processing device (IPD). A MD includes a map information memory storing map information associating coordinate information with character string information, a map image information output unit outputting the information to the IPD, a coordinate information receiving unit receiving IPD'S coordinate information from the IPD, a character string information obtaining unit using the map information and the coordinate information and a character string information transmitting unit sending the information to the IPD. A IPD includes a map image information receiving unit, a map image output unit using the map image information, a coordinate information receiving unit receiving an input of the coordinate information about the IPD, a coordinate information transmitting unit sending the information to the MD, a character string information receiving unit and a character string information memory.

4 Claims, 5 Drawing Sheets

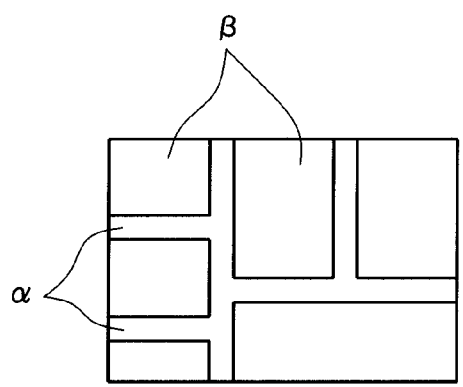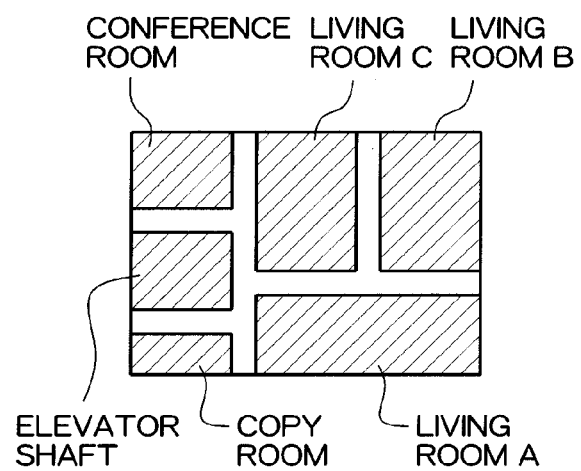

INSTALLATION LOCATION MANAGEMENT SYSTEM AND INSTALLATION LOCATION MANAGEMENT METHOD

CROSS-REFERENCE TO A RELATED APPLICATION

This application is based on, and claims priority under 35 U.S.C. 119 from, Japanese Patent Application No. 2006-349998 filed Dec. 26, 2006.

BACKGROUND

1. Technical Field

The present invention relates to an installation location management system and an installation location management method.

2. Related Art

There has been proposed a management system that remotely manages a printer and other information processing device connected to a network. The management system manages such information as locations where the information processing devices are installed.

In the management system of this type, information about the installation location of an information processing device has to be consistent between the information processing device and a management device.

SUMMARY

According to an aspect of the invention, there is provided an installation location management system including:
  a management device that includes:
    a map information memory that stores map information, the map information associating coordinate information with character string information which represents a location;
    a map image information output unit that outputs map image information to an information processing device connected via a communication system;
    a coordinate information receiving unit that receives, from the information processing device, coordinate information about a location where the information processing device is installed;
    a character string information obtaining unit that uses the map information stored in the map information memory and the coordinate information received by the coordinate information receiving unit to obtain the character string information; and
    a character string information transmitting unit that sends, to the information processing device, the character string information obtained by the character string information obtaining unit; and
  the information processing device that includes:
    a map image information receiving unit that receives the map image information that the management device outputs;
    a map image output unit that outputs a map image in accordance with the received map image information;
    a coordinate information receiving unit that receives an input of the coordinate information about the installation location of the information processing device;
    a coordinate information transmitting unit that sends the received coordinate information to the management device;
    a character string information receiving unit that receives the character string information associated with the coordinate information and sent from the management device; and
    a character string information memory that stores the received character string information.

BRIEF DESCRIPTION OF THE DRAWINGS

An exemplary embodiment of the present invention will be described in detail based on the following figures, wherein:

FIGS. 2A and 2B are diagrams showing an example of map image information and an example of map information, respectively;

DETAILED DESCRIPTION

An exemplary embodiment of the present invention is described below with reference to the drawings.

Figure 1:
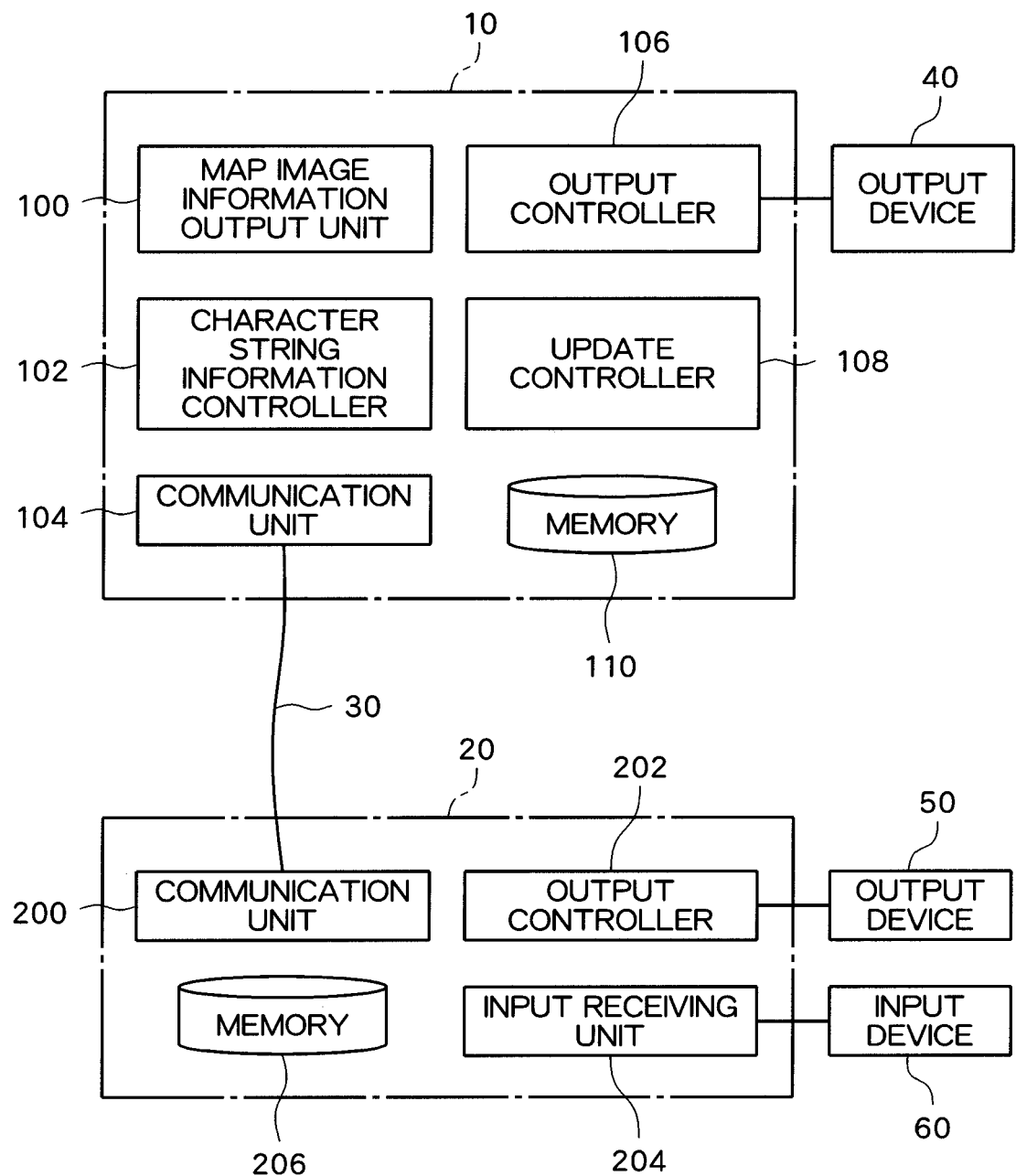
FIG. 1 is a diagram showing a configuration example of an installation location management system according to an exemplary embodiment of the present invention.

FIG. 1 shows a configuration example of an installation location management system according to an exemplary embodiment of the present invention. The installation location management system of FIG. 1 includes a management device 10, an information processing device 20, and a communication system 30.

The management device 10 is composed of a computer, and exchanges information with the information processing device 20 via the communication system 30 to manage the installation location or the like of the information processing device 20.

The information processing device 20 is a device that performs information processing such as obtaining and outputting of information. A printer, a copier, a scanner, or the like serves as the information processing device 20.

The communication system 30 is a network or other devices for enabling the management device 10 and the information processing device 20 to exchange information.

The management device 10 includes a map image information output unit 100, a character string information controller 102, a communication unit 104, an output controller 106, an update controller 108, and a memory 110.

A program that controls a central processing unit (CPU) and the CPU's processing operation functions as the map image information output unit 100. The map image information output unit 100 outputs map image information, which shows the installation location of the information processing device 20, to the information processing device 20 via the communication unit 104 and the communication system 30.

A program that controls the CPU and the CPU's processing operation functions as the character string information controller 102. Based on map information, which is stored in the memory 110, and coordinate information, which is associated with installation location information of the information processing device 20 and received from the information processing device 20 by the communication unit 104, the character string information controller 102 obtains character string information, which represents a location indicated by coordinate information. The map information is information that associates coordinate information with character string information that represents the location indicated by the coordinate information. The obtained character string information is sent to the information processing device 20 via the communication unit 104 and the communication system 30.

A suitable communication interface, such as a universal serial bus (USB) port or a network port, serves as the communication unit 104. The communication unit 104 receives the coordinate information from the information processing device 20 via the communication system 30, and sends the character string information to the information processing device 20 via the communication system 30. The communication unit 104 also executes processing of sending map image information to the information processing device 20 in accordance with an instruction of the map image information output unit 100.

A program that controls the CPU and the CPU's processing operation functions as the output controller 106. The output controller 106 causes an output device 40 to output the coordinate information, the character string information, and the like. The output controller 106 outputs map image information, which illustrates the installation location of the information processing device 20, based on installation location information, which is composed of the coordinates of a location where the information processing device 20 is set up. The output device 40 is a device capable of printing or displaying information, such as a printer, a liquid crystal display (LCD), or a touch panel.

A program that controls the CPU and the CPU's processing operation functions as the update controller 108. The update controller 108 controls updating of information stored in the memory 110, and controls whether it is possible to update the information or not.

A random access memory (RAM) used as a work memory of a CPU, a magnetic storage device such as a hard disk device, or other computer readable storage devices serves as the memory 110. The memory 110 stores, for example, the programs that control the CPU's processing operation, map image information, coordinate information, character string information, and map information which associates the coordinate information with the character string information representing a location. Also stored in the memory 110 is installation location information, which is information about the coordinates of the installation location of the information processing device 20. In the case where the communication unit 104 receives identification information from the information processing device 20, the memory 110 may store the identification information in association with map image information.

The information processing device 20 includes a communication unit 200, an output controller 202, an input receiving unit 204, and a memory 206.

A suitable communication interface, such as a universal serial bus (USB) port or a network port, serves as the communication unit 200. The communication unit 200 receives the map image information and the character string information from the management device 10 via the communication system 30, and sends the coordinate information to the management device 10 via the communication system 30. Preferably, the communication unit 200 is configured to send, to the management device 10, identification information stored in the memory 206 for each information processing device 20.

A program that controls a CPU and the CPU's processing operation functions as the output controller 202. The output controller 202 causes an output device 50 to output images such as map image information. The output device 50 is a device capable of printing or displaying information, such as a printer, a liquid crystal display (LCD), or a touch panel.

A program that controls the CPU and the CPU's processing operation functions as the input receiving unit 204. The input receiving unit 204 receives coordinate information entered by a user through an input device 60. This coordinate information is constituted of coordinates showing, on map image information received by the communication unit 200, a location where the information processing device 20 is set up. The input device 60 is a device with which information is entered, such as a touch panel, a keyboard, or a mouse. The input device 60 may be configured to obtain coordinate information from given location information, which is noted by a user on a map image read by a scanner capable of reading map images. The location information noted on the map image can be a suitable mark such as a cross, a black circle, or a white circle, or a string of characters.

A random access memory (RAM) used as a work memory of a CPU, a read only memory (ROM), a magnetic storage device such as a hard disk device, or other computer readable storage devices serves as the memory 206. The memory 206 stores the programs that control the CPU's processing operation. The memory 206 also stores character string information received from the management device 10 by the communication unit 200, and other data.

FIGS. 2A and 2B show an example of map image information and an example of map information, respectively. Map information shown in FIG. 2B associates coordinate information with character string information representing a location, and is used by the character string information controller 102 in the processing of obtaining character string information.

The example of map image information shown in FIG. 2A illustrates a floor of a building that is used as an office. The floor has a corridor α and rooms β. Corresponding coordinate information is respectively set to the corridor α and the rooms β. The information processing device 20 is installed in each of the rooms β. The example of map information shown in FIG. 2B is character string information that respectively represents the rooms β shown in FIG. 2A as the installation locations of the information processing devices 20. The map information of FIG. 2B, too, includes coordinate information set to the respective rooms, and the coordinate information is associated with character string information.

A user who has changed the installation location of an existing information processing device 20, or has installed a new information processing device 20, consults map image information that the output controller 202 outputs from the output device 50, and enters coordinate information indicating the installation location of the information processing device 20 through the input device 60. The user can enter the coordinate information by, for example, pressing the installation location of the information processing device 20 on the map image information displayed on a touch panel with the finger or the like, inputting numerical values or the like of the coordinate information with a keyboard, specifying the installation location of the information processing device 20 on the map image information displayed on the screen with a mouse or other pointing devices, or noting location information on a printed map image and then having a scanner or the like read the printed map image.

When the management device 10 receives the coordinate information, the character string information controller 102 refers to the map information of FIG. 2B to obtain character string information that represents a room corresponding to the received coordinate information.

Figure 3:
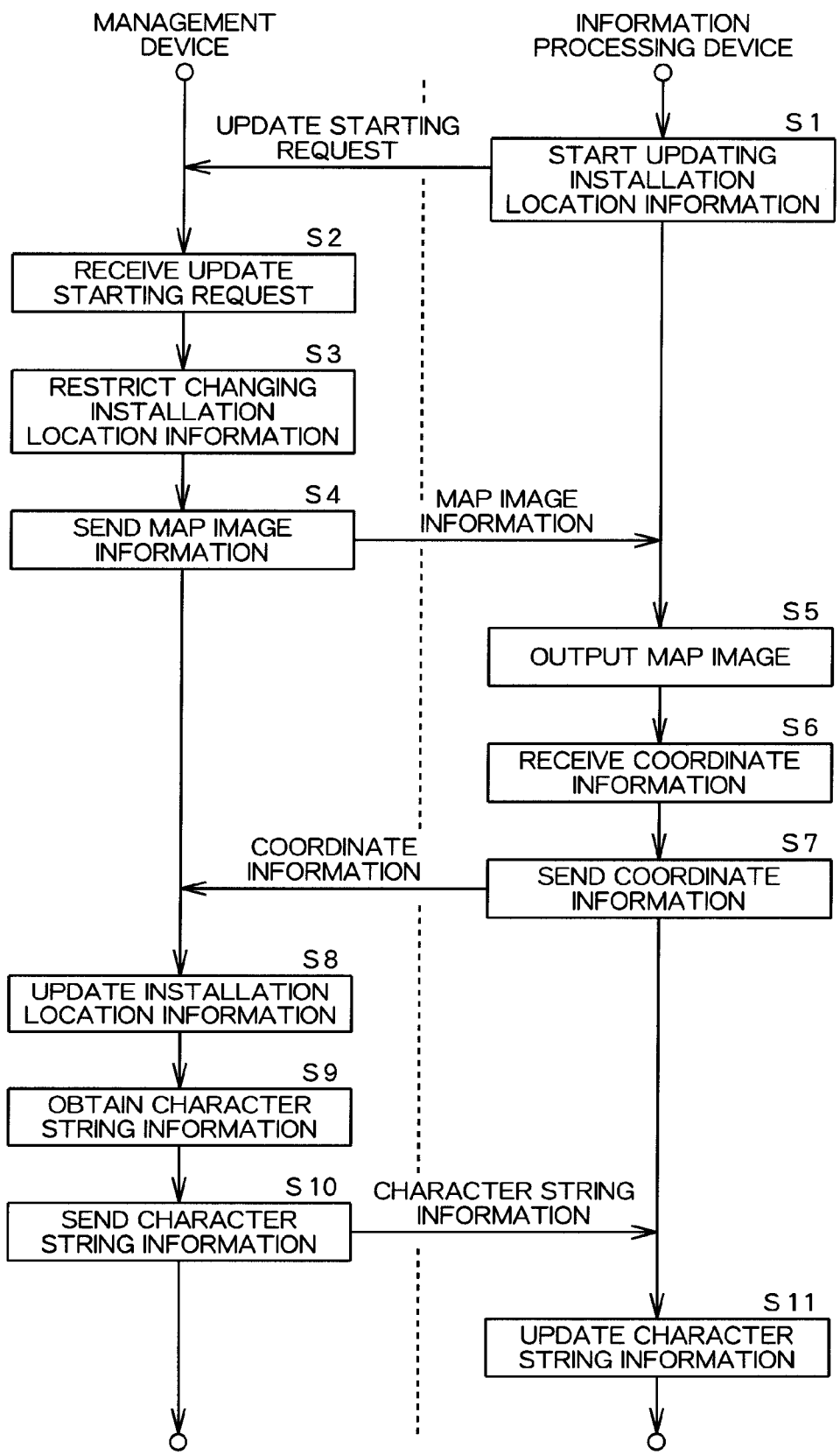
FIG. 3 is a flow chart of an operation example of the installation location management system according to the exemplary embodiment of the present invention.

FIG. 3 shows the flow of an operation example of the installation location management system according to the exemplary embodiment. In FIG. 3, when a user enters through the input device 60 an instruction to update the installation location information of the information processing device 20 (S1), an update starting request is sent from the communication unit 200 to the management device 10. Identification information of the information processing device 20 is attached to the update starting request.

In the management device 10, the update starting request is received by the communication unit 104 and subsequently by the update controller 108 (S2). The update controller 108 then restricts updating of the installation location information of the information processing device 20 stored in the memory 110 (S3). This update control is accomplished by rejecting any update starting requests that are made by information processing devices 20 other than the one that has sent the received update starting request.

The map image information output unit 100 outputs, to the information processing device 20, via the communication unit 104, map image information that indicates the installation location of the information processing device 20 that is identified by the identification information (S4).

In the information processing device 20, the communication unit 200 receives the map image information and the output controller 202 outputs from the output device 50 a map image based on the received map image information (S5).

The user consults the output map image and enters coordinate information that indicates the new installation location of the information processing device 20 through the input device 60. The entered coordinate information is received by the input receiving unit 204 (S6). The coordinate information received by the input receiving unit 204 is sent to the management device 10 by the communication unit 200 (S7).

In the management device 10, the coordinate information is received by the communication unit 104. Based on the received coordinate information, the update controller 108 updates the installation location information of the information processing device 20 stored in the memory 110 (S8).

The character string information controller 102 uses the received coordinate information and map information stored in the memory 110 to obtain character string information that represents a location indicated by the coordinate information (S9). The character string information controller 102 then sends the obtained character string information to the information processing device 20 via the communication unit 104 (S10).

The character string information is received by the communication unit 200 in the information processing device 20. Character string information that has been stored in the memory 206 is updated with the received character string information, and the updated character string information is stored in the memory 206 (S11).

Figure 4:
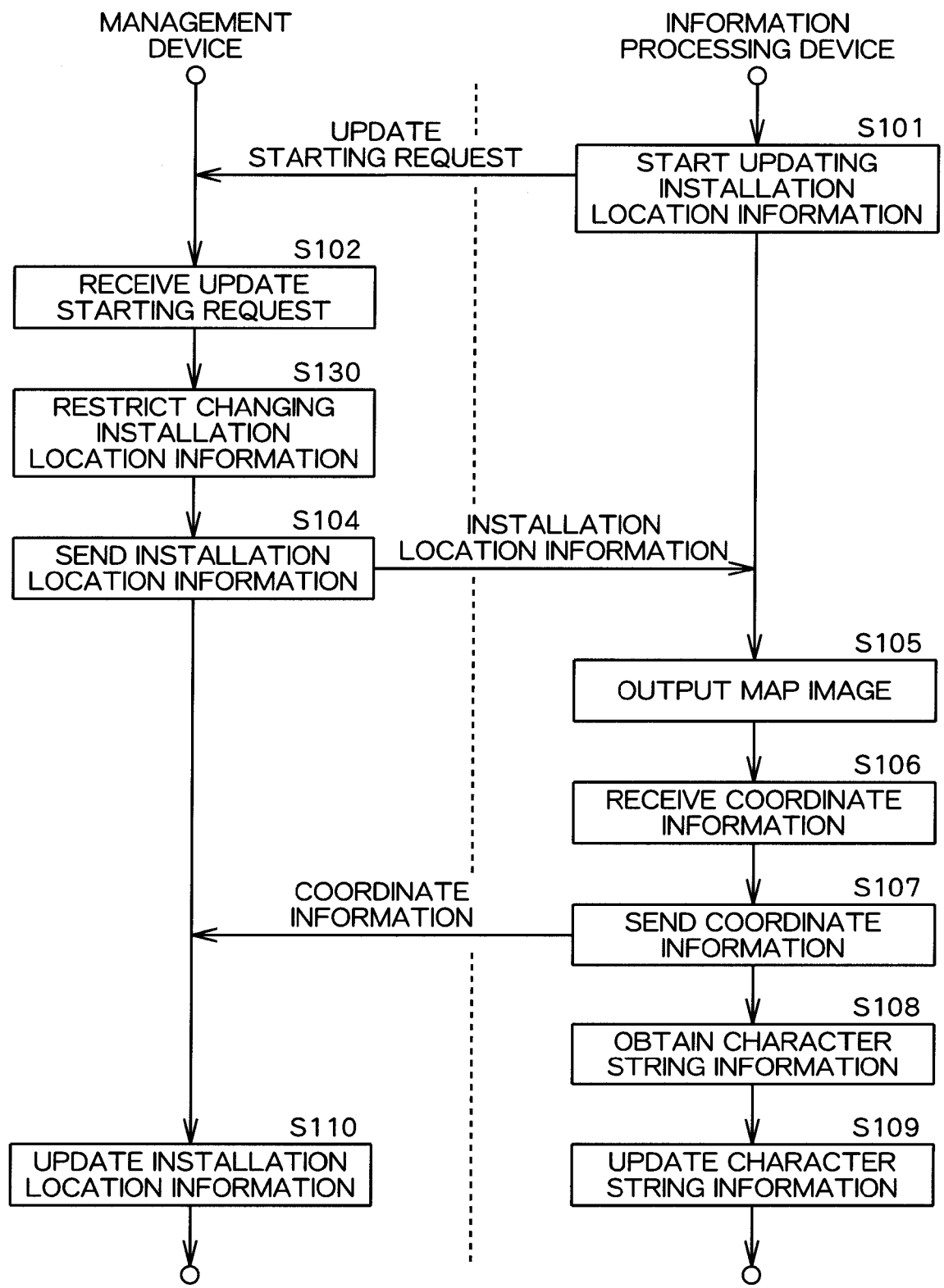
FIG. 4 is a flow chart of another operation example of the installation location management system according to the exemplary embodiment of the present invention.
Figure 5:
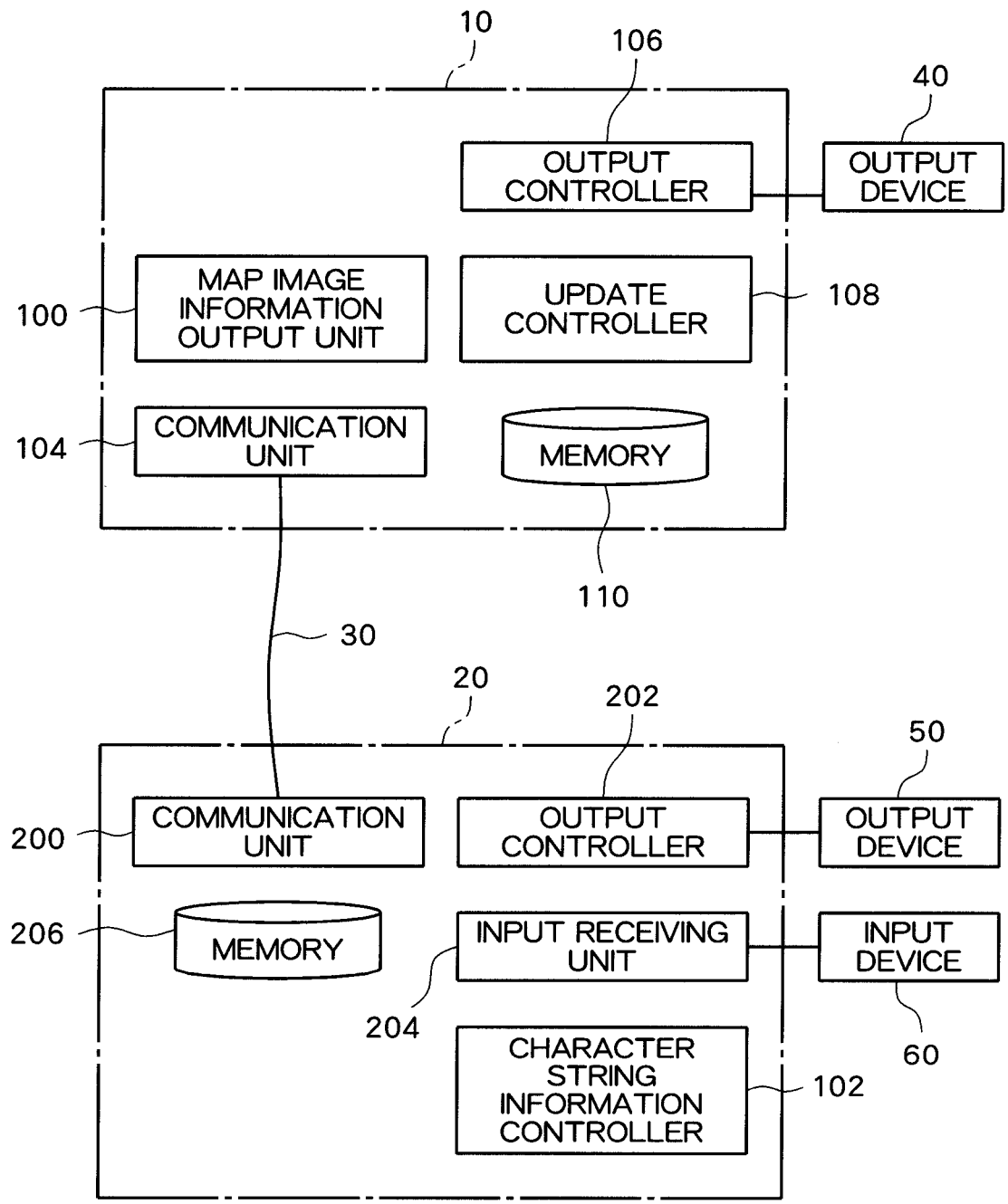
FIG. 5 is a diagram showing another configuration example of an installation location management system according to an exemplary embodiment of the present invention.

FIG. 4 shows the flow of another operation example of the installation location management system according to the exemplary embodiment. This operation example describes a case in which the information processing device 20 has a component equivalent to the character string information controller 102 of the management device 10 shown in FIG. 1. FIG. 5 shows another configuration example of the case described above.

In FIG. 4, when a user enters, through the input device 60, an instruction to update the installation location information of the information processing device 20 (S101), an update starting request is sent from the communication unit 200 to the management device 10. Identification information of the information processing device 20 is attached to the update starting request.

In the management device 10, the update starting request is received by the communication unit 104 and subsequently by the update controller 108 (S102). The update controller 108 then restricts updating of the installation location information of the information processing device 20 stored in the memory 110 (S103). This update control is accomplished by rejecting any update starting requests that are made by information processing devices 20 other than the one that has sent the received update starting request.

The map image information output unit 100 outputs, to the information processing device 20, via the communication unit 104, installation location information which associates with map image information that indicates the installation location of the information processing device 20 that is identified by the identification information, coordinate information, and character string information representing an installation location (S104).

In the information processing device 20, the communication unit 200 receives the map image information and the output controller 202 outputs from the output device 50 a map image based on the received map image information (S105).

The user consults the output map image and enters coordinate information that indicates the new installation location of the information processing device 20 through the input device 60. The entered coordinate information is received by the input receiving unit 204 (S106). The coordinate information received by the input receiving unit 204 is sent to the management device 10 by the communication unit 200 (S107).

A character string information controller 102 in the information processing device 20 uses the entered coordinate information and map information stored in the memory 206 to obtain character string information that represents a location indicated by the coordinate information (S108). The character string information controller 102 in the information processing device 20 then updates character string information stored in the memory 206 with the obtained character string information, and stores the updated character string information in the memory 206 (S109).

In the management device 10, the coordinate information is received by the communication unit 104. Based on the received coordinate information, the update controller 108 updates the installation location information of the information processing device 20 stored in the memory 110 (S110).

Programs that execute the steps shown in FIG. 3 may be provided through communications, or may be provided on a recording medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An installation location management system, comprising:

a management device that comprises:
- a map information memory that stores map information, the map information associating coordinate information with character string information which represents a location;
- a map image information output unit that outputs, in response to receiving an instruction from an information processing device to update installation location information of the information processing device including identification information of the information processing device, map image information to the information processing device connected via a communication system, the map image information associating identification information of information processing devices with their respective locations;
- a controller which restricts updating of the installation location information of the information processing device by rejecting any update starting requests from other information processing devices while the management device is processing the instruction to update the installation location information of the information processing device identified by the identification information;
- a coordinate information receiving unit that receives, from the information processing device and in response to the output of the map image information, coordinate information about a location where the information processing device is installed;
- a character string information obtaining unit that uses the map information stored in the map information memory and the coordinate information received by the coordinate information receiving unit to obtain the character string information; and
- a character string information transmitting unit that sends, to the information processing device in response to the reception of the coordinate information, the character string information obtained by the character string information obtaining unit; and the information processing device that comprises:
- a map image information receiving unit that receives the map image information that the management device outputs;
- a map image output unit that outputs a map image in accordance with the received map image information;
- a coordinate information receiving unit that receives an input of the coordinate information about the installation location of the information processing device;
- a coordinate information transmitting unit that sends the received coordinate information to the management device;
- a character string information receiving unit that receives the character string information associated with the coordinate information and sent from the management device; and
- a character string information memory that stores the received character string information.

2. The installation location management system according to claim 1,
wherein the map image output unit of the information processing device outputs the map image in a printed form, and
wherein the coordinate information receiving unit of the information processing device reads location information noted on the printed map image and, based on the read location information, receives the coordinate information.

3. The installation location management system according to claim 1,
wherein the map information memory of the management device stores the identification information in association with the map image information, and
wherein the map image information output unit of the management device outputs the map image information that is associated with the identification information.

4. An installation location management method, comprising:
a managing process, executed by a management device, that comprises:
- storing map information, the map information associating coordinate information with character string information which represents a location;
- outputting, in response to receiving an instruction from an information processing device to update installation location information of the information processing device including identification information of the information processing device, map image information to the information processing device connected via a communication system, the map image information associating identification information of information processing devices with their respective locations;
- restricting updates of the installation location information of the information processing device by rejecting any update starting requests from other information processing devices while the management device is processing the instruction to update the installation location information of the information processing device identified by the identification information;
- receiving, from the information processing device and in response to the outputting of the map image information, coordinate information about a location where an information processing device is installed;
- using the stored map information and the received coordinate information to obtain the character string information; and
- sending, in response to receiving the coordinate information, the obtained character string information to the information processing device; and an information processing process that comprises:
- receiving the map image information that is output in the managing process;
- outputting a map image in accordance with the received map image information;
- receiving an input of the coordinate information about the installation location of the information processing device;
- sending the received coordinate information to the managing process;
- receiving the character string information which is sent in the managing process and associated with the coordinate information; and
- storing the received character string information.

* * * * *